Patented Feb. 16, 1937

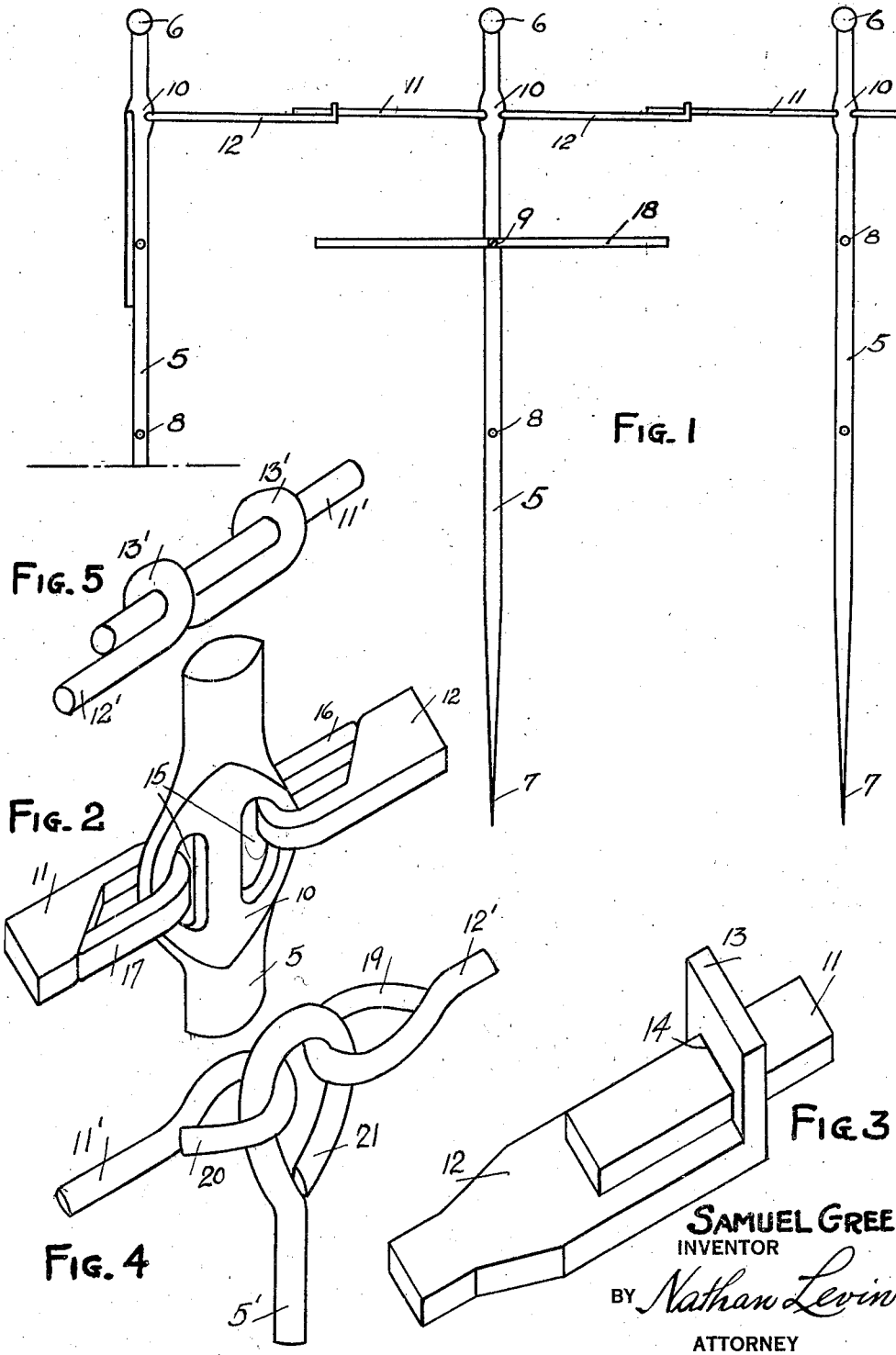

2,070,988

UNITED STATES PATENT OFFICE 2,070,988

TRELLIS

Samuel Green, Trenton, N. J.

Application September 9, 1936, Serial No. 99,918

3 Claims. (Cl. 47—44)

My invention relates to trellises and more particularly to metallic trellises, and has for its object the provision of a simple and inexpensive device of this character which may be easily assembled for use in single or multiple arrangement and which will be very durable.

In the accompanying drawing forming part of this specification and in which like numeral references are used to designate like parts throughout the same:

Fig. 1 is a view showing my invention set up for use,

Fig. 2 is a detail in perspective,

Fig. 3 is a detail in perspective,

Fig. 4 is a detail in perspective of a modification, and

Fig. 5 is a detail of another modification.

In Fig. 1 a trellis is shown as being made of the central stake portion 5 of suitable length and material, preferably metal. The stake 5 is ornamented with a knob 6 and the lower end is sharpened as shown at 7 to facilitate driving the trellis into the ground. A number of spaced holes 8 are arranged lengthwise of the stake, these may be threaded if desired for a purpose to be described later.

The stake 5 may be of any suitable cross section and is here shown as round. This stake is flattened out at 10 as shown in detail in Fig. 2. In the flattened out portion 10 is formed the two holes 15, which take the two arms 11 and 12 of each trellis. The arm 11 is fastened to the stake through an opening 15 by means of the closed hook 17. In like manner the arm 12 is fastened by means of the closed hook 16.

The arms 11 and 12 being pivoted to the stake 5, normally hang straight down as shown by the arm 11 of the left hand trellis in Fig. 1. When it is desired to use more than one trellis and to have the arms thereof interjoin, a special arrangement on the ends of the arms permits such use. As shown in detail in Fig. 3, the end of the arm 12 is flattened and upright 13 containing the opening 14 is formed at said end. The end of the arm 11 of an adjoining trellis may be placed in the opening 14 and in this way the adjoining arms 11 of one trellis and the arms 12 of another will extend in a straight line as shown in Fig. 1. In this way a series of trellises may be used as desired to form a series of upright stakes and a series of horizontal supports.

The holes 8 are used to support horizontal bars or members 18, of which one is shown in Fig. 1. Any number of these may be used as desired for horizontal supports. The said members 18 are fastened along the stake 5 at the holes 8 by means of the screw 9 which may be threaded into the stake or may pass through the same and thread into a suitable nut. Adjoining members 18 on adjacent stakes will abut each other and form an extended horizontal support for garden use.

In Fig. 4 is shown a modification of the means by which the arms are secured to the main stake body. In this modification, the stake 5' terminates in the open hook member 21 and the arms 11' and 12' are joined thereto by means of the closed hook members 20 and 19 respectively.

It will be obvious from the preceding description of the metal trellises that I have provided a useful and ornamental and inexpensive garden accessory that may be used year after year with a minimum of effort. What I desire to cover as the substance of my invention is contained in the claims in which the invention is set forth.

In Fig. 5 is shown a modification of the means by which the free ends of the arms may be joined to each other. The arms 11' and 12', here shown as tubular in form, join with each other to form the horizontal support. The end of the arm 11' is straight, but at the end and spaced from the end of the arm 12' are the loops or turns 13', 13' made in the metal of which said arm 12' is made. The loops are large enough to receive the arm 11' and in this manner the two arms form a continuous horizontal support.

I claim:

1. A trellis of the character described, comprising a plurality of uprights, arms pivotally connected with and extending from opposite sides of said uprights at a point near their upper end, the free end of an arm of one upright having means to engage the free end of an arm of another upright so that said mentioned arms extend horizontally.

2. A trellis of the character described, comprising a plurality of uprights, a plurality of arms pivotally connected with and extending from opposite sides of said uprights at a point near the upper ends of said uprights, the free ends of certain of the arms of each upright having means to engage the free ends of certain other of the arms of each upright so that said mentioned arms extend horizontally.

3. A trellis of the character described, comprising one or more uprights, a plurality of arms pivotally connected with and extending from opposite sides of each of said uprights at a point near their upper end, the free ends of certain of the arms of each upright having means to engage the free ends of certain other of the arms of other uprights so that said mentioned arms extend horizontally, and means on each upright for supporting other arms spaced horizontally along said upright.

SAMUEL GREEN.